United States Patent Office 2,962,916
Patented Dec. 6, 1960

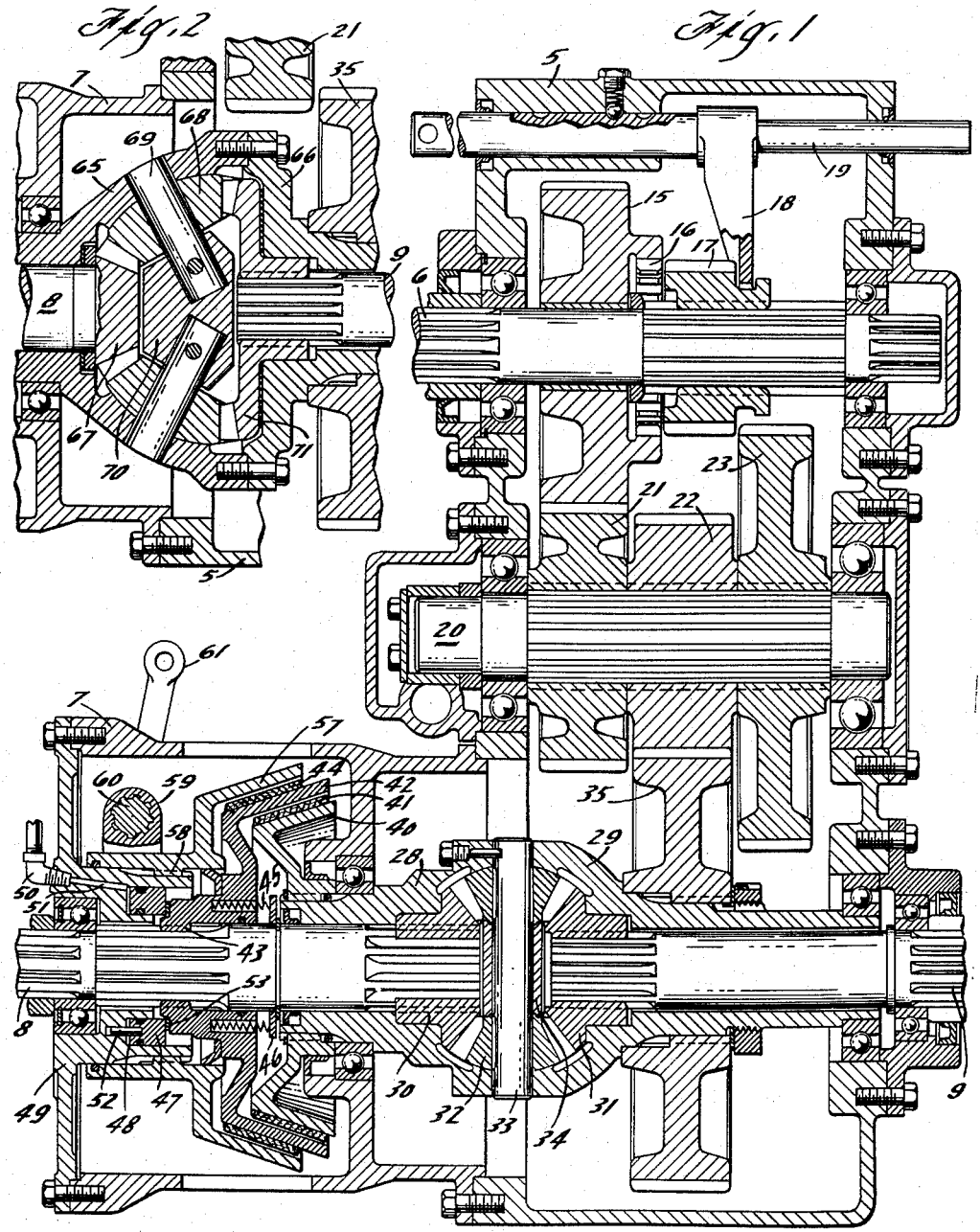

2,962,916

TRANSFER CASE AND CENTER DIFFERENTIAL LOCK

Lester M. Koelsch, Milwaukee, Wis., assignor, by mesne assignments, to FWD Corporation, a corporation of Wisconsin Filed May 28, 1958, Ser. No. 738,331

6 Claims. (Cl. 74—710.5)

This invention relates to improvements in geared power transmissions for multiple output shafts driven through a differential and particularly to a clutch for engaging and disengaging one output shaft while the drive is in motion and to a brake combined with the clutch for locking one output shaft against rotation.

In one embodiment of the invention applied to multiple axle drive vehicles having a single source of power for driving both front and rear axles, the drive train includes a transfer power transmission fixed on the vehicle frame, and which may have several trains of gears for speed changing. The power flows through differential gearing to output shafts for driving the front axles and the rear axles respectively. For some uses, the same amount of torque is to be delivered to both axles so that the side gears of the differential are of equal size. For other uses, a greater amount of torque is to be delivered to the axles where the load is more concentrated, so that the side gears of the differential are then of different size. Hence, it is desirable to provide constructions which can be used with either kind of differential.

In operation of multiple axle drive vehicles, it is desirable to be able to prevent the differential from functioning under conditions in which one or more wheels may lose traction, so that maximum torque may be transmitted to the remaining wheels. This invention relates to a combination structure which may be used either to clutch one output shaft to the differential pinion carrier or to lock both transfer output shafts as when the present device is to be used as a parking brake. Power for clutching one output shaft to the differential pinion carrier is supplied by a fluid pressure-operated piston and manually operable mechanical means may be used to lock the entire differential to the transfer case and thus prevent all rotation of both output shafts.

It will be understood that the clutch comprising the first and second clutch members, their separating springs and the hydraulic operating means for the second clutch member may be used without the lock-out brake and that such clutch may be applied alone to either or both of the output shafts for selective operation of either shaft or of both of the shafts from the differential. For uses such as in machine tools, it will frequently be unnecessary to provide any lock-out brake whatever but the brake member may be combined with the clutch members on either or both output shafts to provide positive means for holding either or both such shafts against rotation relative to the casing enclosing the differential and portions of the output shafts.

In the drawings,

Figure 1 is a vertical cross-sectional view on substantially a central plane of a power transfer transmission for multiple axle drive vehicles, with gearing which can be selected to provide either of two speeds and with a combination clutch and differential brake applied to one transfer output shaft; the differential delivering equal amounts of power to the output shafts; and Figure 2 is a fragment of Figure 1 showing a differential for delivering unequal amounts of power to the output shafts.

The complete power train of multiple axle vehicles is well known, as shown in patent to Simonds, 2,768,538, and will not be described herein except as neccessary to illustrate the present invention.

An upper transfer case portion 5 contains the speed change gearing, to which power is delivered by an input shaft 6 and a lower transfer case portion 7 contains differential gearing delivering power to two output shafts 8, 9 under the control of the combined clutch and brake of the present invention. Power is received from the vehicle engine by way of the usual propeller shaft coupled to the transfer input shaft 6 through a known universal joint. Shaft 6 has a gear 15 fixed thereon which is formed with an annular flange 16 internally toothed to form one-half of a jaw clutch. The other half of the jaw clutch is a spur gear 17 slidable on a spline on input shaft 6 when actuated by a shifting fork 18 on a rod 19 extending from the casing 5 for connection with a known linkage. The teeth of spur gear 17 serve both for engagement with the flange 16 of gear 15 and for another purpose to be described.

A counter shaft 20 has fixed thereon gears 21, 22 and 23, of which the gear 21 is always in mesh with the gear 15 and the gear 23 may be engaged by the teeth of the jaw clutch part 17, then acting as a gear. Thus power may be delivered to the gear 22 either by way of gears 15 and 21, when jaw clutch parts 16, 17 are engaged, or by way of gear 17 engaged with gear 23, the two above gear trains having different ratios so that the gear 22 will be driven at different speeds depending on the gear train in use.

The aligned output shafts 8, 9 in lower transfer case portion 7 are joined by differential gearing comprising differential pinion carrier halves 28 and 29 rigidly joined, side gears 30 and 31 and pinions 32 rotatable on their respecitve pinion shafts 33 mounted in the carrier 28, 29 and in a central ring 34. The differential carrier portion 28 is rotatably journalled on output shaft 8 and the gear carrier portion 29 is rotatably journalled on output shaft 9. The side gears 30 and 31 are shown herein as being of equal size so that equal amounts of power may be delivered to the two output shafts 8 and 9. A gear 35 is non-rotatably fixed on differential carrier portion 29 and is in constant mesh with gear 22 to make it a common last gear of the speed change gear trains above described.

Gear carrier portion 28 is externally splined to receive a first member 40 of a clutch, which has a conical surface on which friction member 41 is fixed. A second clutch member 42 is engaged at 43 with a spline cut into output shaft 8 and has a female conical surface engageable with the clutch friction member 41, the clutch member 42 also having a friction member 44 on a male conical surface. Clutch member 42 is urged to the left as shown in the drawing, axially of the output shaft 8 and is urged away from clutch member 40 by springs 45 acting between the clutch member 42 and a plate 46 bearing on a snap ring set into a groove in the shaft. Movement of the clutch member 42 toward clutch member 40, is produced by an annular piston 47 movable in a cylinder 48 formed in an end plate 49 of the lower casing 7. Fluid pressure is admissible to cylinder 48 through connector 50 and passage 51 and the piston 47 is held against rotation in its cylinder by pins 52 seating in the casing and in the piston. When pressure is applied through connector 50 and passage 51, the piston 47 presses on thrust washer 53 mounted on an end of the clutch member 42 and causes the clutch member to move into engagement with the band 41 of the clutch member 40 against the bias of springs 45. The differential pinion carrier 28, 29 is thus locked to the shaft 8 so that such shaft must rotate under the action of differential 28—34.

A third member 57 having a female conical surface, is splined at 58 to the casing end plate 49 and is movable by a fork 59 on a rod 60 extending outside the casing for connection with an arm 61 of a linkage for manual movement of such third member by the vehicle operator. When the vehicle is to be parked, the third member 57 is moved axially on the shaft 8 to engage friction band 44 of second clutch member 42 and thus engage output shaft 8 with casing member 7. Assuming that clutch member 42 already bears on clutch member 40 and as the brake member 57 is splined to the casing 7, 49 and such casing is fixed to the frame of the vehicle, no movement of differential carrier 28, 29 is now possible, and both output shafts 8 and 9 are held stationary so that neither of the vehicle axles can move and the vehicle is "parked." If clutch member 42 is not bearing on clutch member 40, further movement of brake member 57 causes such bearing and the output shafts are locked without movement of piston 47.

Figure 2 shows a differential construction fitting into the same space as differential gearing 28—34 described above, but in which the power is unequally divided between the output shafts 8 and 9, the ratio being 40:60. The differential carrier parts 65 and 66 are now so shaped that carrier part 65 encloses a relatively small side gear 67 and substantially encloses pinions 68 which are on shafts 69 extending from the carrier part 65 into a central block 70. Another side gear 71 engages the pinions 68 and is of substantially larger diameter than the side gear 67. Thus it is possible to deliver a larger amount of power to the shaft 9 than is delivered to the shaft 8, it being assumed that the shaft 9 transmits power to the rear axle of the vehicle where the major portion of the load is concentrated. It will be understood that the ratio of power division may be greater than above stated, as side gear 71 may be made even larger within the space available.

It will thus be seen that the present device provides first and second clutch members cooperating to engage or disengage the differential and one output shaft and that movement of the second clutch member is obtained by way of a very simply constructed cylinder and fluid pressure operated piston. Engagement and disengagement of the differential and one shaft, may occur when the parts are in motion. A third member similar to the clutch members, is manually operable for causing movement of the second clutch member to produce co-action of all three of the said members to hold the vehicle stationary, with or without application of fluid pressure to the piston.

I claim:

1. In a transmission for power flow to a plurality of axles of a multiple axle drive vehicle, a casing fixed on the frame of the vehicle, an input shaft extending into the casing, output shafts extending from the casing for connection respectively with the front axles and the rear axles of the vehicle, differential gearing comprising a pinion carrier and side gears and pinions for connecting the output shafts, a first friction member mounted on the differential pinion carrier, a second friction member mounted on one output shaft and engageable with the first friction member for connecting the said one output shaft with the carrier, fluid pressure-operated means for moving the second friction member, a third friction member mounted on the casing for movement into frictional engagement with and for pressing the second friction member into engagement with the first friction member irrespective of non-operation of said fluid pressure-operated means for locking both output shafts against rotation relative to the casing.

2. In a transmission for power flow to both the front and rear axles of a multiple axle drive vehicle, a casing fixed on the frame of the vehicle, an input shaft extending into the casing, output shafts extending from the casing for connection respectively with the front axles and the rear axles of the vehicle, differential gearing comprising pinions and a carrier therefor and side gears for connecting the output shafts, a first friction member fixed on the differential pinion carrier, a second friction member mounted on one output shaft for rotation therewith and movement axially thereof for engagement with the first friction member for connecting the said one output shaft with the differential pinion carrier, springs acting between said one output shaft and the second friction member for urging the second friction member away from the first friction member, an annular fluid pressure-operated piston encircling the said one output shaft for moving the second friction member toward the first friction member, a third friction member mounted on the casing for movement axially of the output shafts toward the first and second friction members, and means for moving said third friction member into frictional engagement with the second friction member for locking both output shafts against rotation relative to the casing.

3. In a transmission for delivery of power to multiple shafts, a casing, an input shaft extending into the casing, differential gearing including a pinion carrier within the casing for receiving power from the input shaft, output shafts in and extending from the casing and for receiving power from the differential gearing, a first friction member connected with the differential pinion carrier, a second friction member mounted on one output shaft for rotation therewith and movement axially thereof, and third friction means mounted on the casing for pressing the second friction member into engagement with the first friction member and for connecting the differential carrier with the said one output shaft.

4. In a transmission for delivery of power to multiple shafts, a casing, an input shaft extending into the casing, differential gearing including a pinion carrier within the casing for receiving power from the input shaft, output shafts in and extending from the casing and for receiving power from the differential gearing, the casing having an annular cylinder formed therein around one output shaft, a first friction member fixed on the differential pinion carrier, a second friction member splined on one output shaft, springs acting between the said one output shaft and the second friction member for urging the second friction member away from the first friction member, and an annular piston held in the casing cylinder for reciprocation therein toward said pinion carrier upon applying fluid presure thereto for pressing the second friction member into frictional engagement with the first friction member, said second clutch member being released from said engagement with said first friction member by said springs upon release of fluid pressure from said cylinder.

5. In a differential, the combination with output shafts having gears, and a pinion carrier normally rotatable coaxially with the shafts and having pinions meshing with said gears, of a normally disengaged first clutch means including first and second members respectively connected with the pinion carrier and with one of said shafts and relatively movable to and from engagement, means for actuating said second member to and from such engagement, a brake means comprising a third member having a fixed support and a splined connection thereto and movable from a normally retracted position to an advanced position in which it engages said second member to resist rotation of said one shaft, said third member being further movable beyond said advanced position to engage said second member with said first member to resist rotation of said carrier and both of said shafts, and means for the actuation of said third member to said advanced position and therebeyond to further actuate said second member into engagement with said first member.

6. The device of claim 5 in which the means for actuating the second member and for actuating the third member respectively comprise a hydraulic motor and a mechanical shifting fork, said second member being provided with retracting spring means having a bias opposed to the action of said motor and the mechanical shifting fork being effective to override the bias of said spring means in actuating the second member into engagement with the first member.

References Cited in the file of this patent

UNITED STATES PATENTS

| | | |
|---|---|---|
| 887,413 | Monahan | May 12, 1908 |
| 1,189,368 | Link | July 4, 1916 |
| 1,977,218 | Wagner et al. | Oct. 16, 1934 |
| 2,318,481 | Greenlee et al. | May 4, 1943 |
| 2,432,272 | Bariffi | Dec. 9, 1947 |
| 2,757,513 | Banker | Aug. 7, 1956 |
| 2,830,670 | Ferguson | Apr. 15, 1958 |